(12) United States Patent
Kawanabe

(10) Patent No.: US 8,087,835 B2
(45) Date of Patent: Jan. 3, 2012

(54) LENS BARREL AND IMAGING APPARATUS

(75) Inventor: Yuichi Kawanabe, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/852,878

(22) Filed: Aug. 9, 2010

(65) Prior Publication Data

US 2011/0044674 A1   Feb. 24, 2011

(30) Foreign Application Priority Data

Aug. 21, 2009   (JP) ................. P2009-191889

(51) Int. Cl.
*G03B 17/04* (2006.01)
*G03B 5/02* (2006.01)
*G02B 7/02* (2006.01)

(52) U.S. Cl. ........................ 396/349; 359/826

(58) Field of Classification Search .......... 396/79, 396/85, 529, 349; 359/784, 819, 825, 826
See application file for complete search history.

(56) References Cited

U.S. PATENT DOCUMENTS

2004/0114257 A1* 6/2004 Tanaka et al. ................. 359/819

FOREIGN PATENT DOCUMENTS

JP            3842087 B2     11/2006

* cited by examiner

*Primary Examiner* — Rochell-Ann J Blackman
(74) *Attorney, Agent, or Firm* — Birch, Stewart, Kolasch & Birch, LLP

(57) ABSTRACT

Disclosed are a lens barrel capable of preventing a reduction in strength while maintaining a small size and a small thickness and an imaging apparatus including the lens barrel. A first moving cylinder in which a cam groove to which a second cam follower pin is fitted is provided in an inner surface is arranged outside a cam cylinder having the second cam follower pin provided on an outer surface thereof. In addition, a third lens group frame in which a cam follower pin fitted to one of the cam grooves is provided on an outer surface and a second lens group frame in which a cam follower pin fitted to the other groove is provided on an outer surface are arranged inside the cam cylinder having the cam grooves provided in the inner surface thereof.

2 Claims, 4 Drawing Sheets

LENS BARREL AND IMAGING APPARATUS

CROSS-REFERENCE TO RELATED APPLICATIONS

This application is based upon and claims the benefit of priority from the Japanese Patent Application No. 2009-191889 filed on Aug. 21, 2009; the entire contents of which are incorporated herein by reference.

BACKGROUND OF THE INVENTION

1. Field of the Invention

The present invention relates to a lens barrel that holds a zoom lens including three lens groups and can be extended and collapsed and an imaging apparatus including the lens barrel.

2. Description of the Related Art

In recent years, the size and thickness of imaging apparatuses have been reduced. In addition, there is a demand for an imaging apparatus with a small size and a small thickness that includes a lens barrel which holds a zoom lens including a plurality of lens groups and can be extended and collapsed.

For example, a lens barrel has been proposed which includes a rotating cylinder (cam cylinder) having cam grooves provided in the inner and outer surfaces thereof (for example, see Japanese Patent No. 3842087).

In the lens barrel disclosed in Japanese Patent No. 3842087, the cam grooves are provided in the outer surface and the inner surface of the rotating cylinder (cam cylinder). Therefore, according to the lens barrel, it is possible to move a plurality of lens groups in the optical axis direction without any failure and reduce the size of the lens barrel in the optical axis direction.

However, the cam grooves provided in the outer surface and the inner surface of the rotating cylinder (cam cylinder) overlap each other in a perspective view of the lens barrel as viewed from a direction perpendicular to the optical axis. In this case, the strength of the overlap portion is less than that of other portions.

SUMMARY OF THE INVENTION

The invention has been made in order to solve the above-mentioned problems, and an object of the invention is to provide a lens barrel capable of preventing a reduction in strength while maintaining a small size and a small thickness and an imaging apparatus including the lens barrel.

According to an aspect of the invention, a lens barrel includes: at least three lens groups; a fixed cylinder; a first moving cylinder to which a first lens group frame that holds a first lens group arranged closest to an object side among the three lens groups is fixed and which has a cam groove formed in an inner surface thereof and is movable in a straight line in an optical axis direction; second and third lens group frames that respectively hold second and third lens groups among the three lens groups, are movable in a straight line in the optical axis direction, have diameters smaller than that of the first moving cylinder, and include cam pins formed on the outer surfaces thereof; and a cam cylinder that is movable in the optical axis direction while being rotated about an optical axis with respect to the fixed cylinder, is provided between the inner surface of the first moving cylinder and the outer surfaces of the second and third lens group frames, and includes a cam pin which is provided on the outer surface and is fitted to the cam groove provided in the inner surface of the first moving cylinder and a cam groove which is provided in the inner surface and to which the cam pins provided on the outer surfaces of both the second lens group frame and the third lens group frame are fitted.

In the invention, the term "lens groups" does not mean lens groups that are optically divided, but means lens groups as moving units.

In the lens barrel according to the above-mentioned aspect, the first moving cylinder in which the cam groove to which the cam pin is fitted is provided in the inner surface is arranged outside the cam cylinder having the cam pin provided on the outer surface thereof. In addition, the second and third lens group frames in which the cam pins fitted to the cam grooves are provided on the outer surfaces are arranged inside the cam cylinder having the cam grooves provided in the inner surface thereof. Therefore, unlike the lens barrel according to the related art in which the cam grooves are provided in the outer surface and the inner surface of the rotating cylinder (cam cylinder), the cam grooves do not overlap each other in a perspective view of the cam cylinder as viewed from a direction perpendicular to the optical axis. Therefore, according to the lens barrel of the invention, it is possible to prevent a reduction in strength while maintaining a small size and a small thickness.

The lens barrel according to the above-mentioned aspect may further include a second moving cylinder and a key ring. The fixed cylinder may have a cam groove and a straight-ahead key groove provided in an inner surface thereof. The second moving cylinder may include a straight-ahead key groove that is provided in an inner surface thereof and a cam pin that is provided on an outer surface thereof and is fitted to the cam groove provided in the inner surface of the fixed cylinder. The second moving cylinder may be moved in the optical axis direction while being rotated when the cam pin is moved along the cam groove by a driving force. The key ring may include a cam groove that passes through the key ring from an inner surface to an outer surface and a straight-ahead key groove that is provided in the inner surface thereof. The key ring may be fitted to the straight-ahead key groove that is provided in the inner surface of the fixed cylinder and may be moved integrally with the second moving cylinder in the optical axis direction, without being rotated, when the second moving cylinder is rotated. The cam cylinder may further include a cam pin that is provided on the outer surface so as to protrude toward the outside, is fitted to the cam groove passing through the key ring from the inner surface to the outer surface, protrudes from the cam groove to the outside, and has a leading end portion which protrudes toward the outside and is fitted to the straight-ahead key groove provided in the inner surface of the second moving cylinder. The cam cylinder may be moved along the cam groove of the key ring in the optical axis direction while being rotated integrally with the second moving cylinder when the second moving cylinder is rotated.

The lens barrel according to the above-mentioned aspect may further include: a third moving cylinder that is fitted to the straight-ahead key groove provided in the inner surface of the key ring and is moved integrally with the cam cylinder in the optical axis direction, without being rotated, when the cam cylinder is rotated. The third lens group frame may be fitted to the straight-ahead key groove provided in the inner surface of the key ring and may be moved in the optical axis direction, without being rotated, when the cam cylinder is rotated. The second lens group frame may have a straight-ahead key groove provided in the inner surface thereof. The third lens group frame may be fitted to the straight-ahead key groove of the second lens group frame. The second lens group frame may be moved in the optical axis direction, without being rotated, when the cam cylinder is rotated. The first moving cylinder may be fitted to the straight-ahead key groove provided in the inner surface of the third moving cylinder and may be moved in the optical axis direction, without being rotated, when the cam cylinder is rotated.

According to another aspect of the invention, an imaging apparatus includes the lens barrel according to the above-mentioned aspect; a camera body which includes an imaging device and to which the fixed cylinder is fixed; and an imaging lens including at least three lens groups and a focus lens that form the image of an object on the imaging device.

In the invention, the "imaging device" means an image sensor, such as a CCD (Charge Coupled Device) image sensor or a CMOS (Complementary Metal Oxide semiconductor) image sensor.

In the invention, the term "lens groups" does not mean lens groups that are optically divided, but means lens groups as moving units.

The imaging apparatus according to the above-mentioned aspect of the invention includes the lens barrel according to the above-mentioned aspect of the invention. Therefore, according to the imaging apparatus of the above-mentioned aspect of the invention, it is possible to obtain an imaging apparatus including a lens barrel capable of preventing a reduction in strength while maintaining a small size and a small thickness.

According to the above-mentioned aspects of the invention, it is possible to provide a lens barrel capable of preventing a reduction in strength while maintaining a small size and a small thickness and an imaging apparatus including the lens barrel.

DESCRIPTION OF THE PREFERRED EMBODIMENTS

Hereinafter, exemplary embodiments of the invention will be described with reference to the accompanying drawings.

Figure 1:
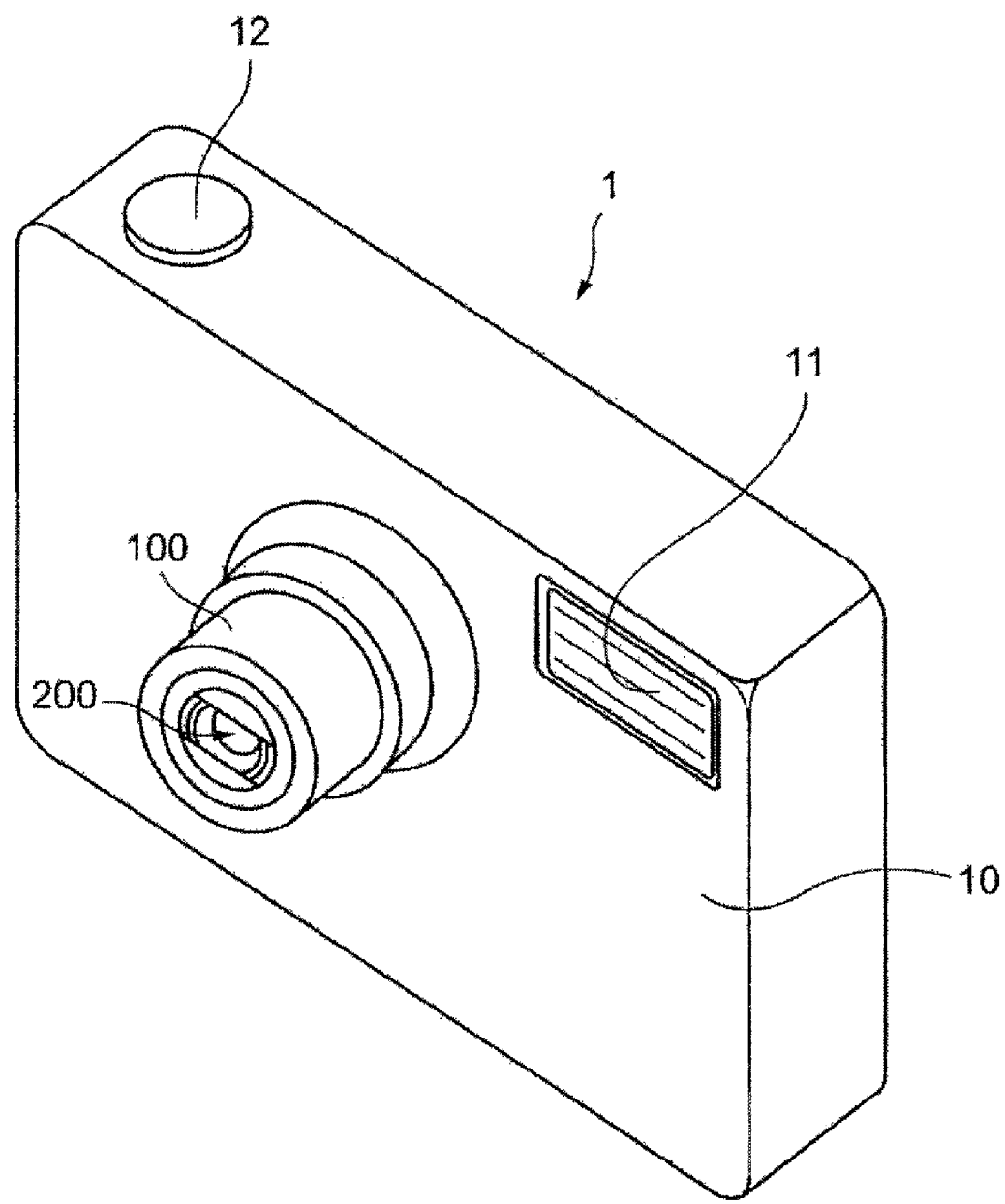
FIG. 1 is a perspective view illustrating the front surface of a digital camera, which is an example of an imaging apparatus according to an embodiment of the invention, as obliquely viewed from the upper side.
Figure 2:
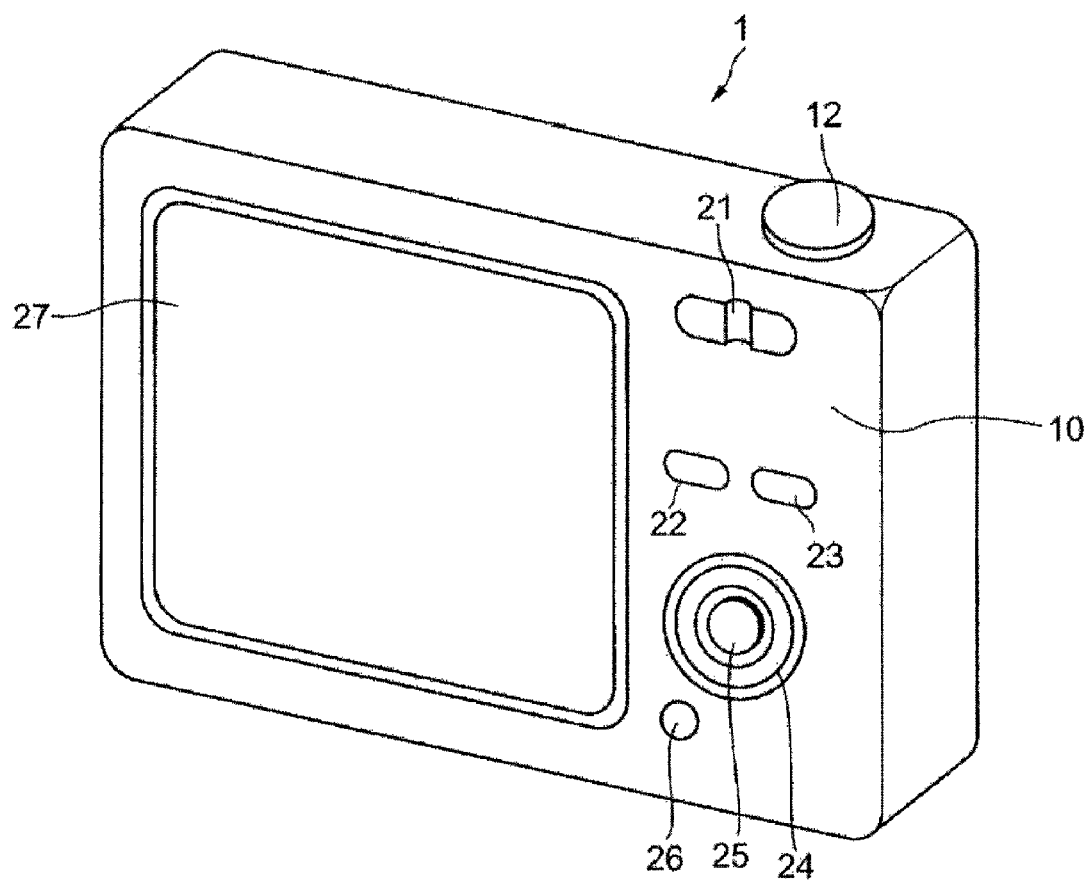
FIG. 2 is a perspective view illustrating the rear surface of the digital camera, which is an example of the imaging apparatus according to the embodiment of the invention, as obliquely viewed from the upper side.

FIGS. 1 and 2 are perspective views respectively illustrating the front and rear surfaces of a digital camera 1, which is an example of an imaging apparatus according to an embodiment of the invention, as obliquely viewed from the upper side.

A lens barrel 100 in an extended state in which the lens barrel protrudes from a camera body 10 is provided on the front surface of a digital camera 1. The lens barrel 100 has the extended state shown in FIG. 1 and a collapsed state (not shown) in which the length of the lens barrel is smaller than that of the lens barrel in the extended state and the lens barrel is accommodated in the camera body 10. The lens barrel 100 is an example of a lens barrel according to the invention. The structure of the lens barrel 100 will be described in detail below.

An imaging lens 200 including a zoom lens that has a variable focal length and a focus lens that brings an object into focus is provided in the lens barrel 100. A flash light emitting unit 11 that emits flash light during image capture is provided on the front surface of the digital camera 1, and a shutter button 12 which issues an imaging instruction to the digital camera 1 and can be pressed in two stages, that is, halfway and fully is provided on the upper surface of the digital camera 1.

In addition, a T/W (tele/wide) switching lever 21, an imaging/reproduction switching button 22, a function button 23, a four-direction key 24, an OK key 25, a DISP/BACK key 26, and an LCD panel 27 for displaying a screen are provided on the rear surface of the digital camera 1 shown in FIG. 2.

The T/W switching lever 21 is for changing the focal length of the imaging lens 200. Whenever the imaging/reproduction switching button 22 is pressed, the operation mode of the digital camera 1 is switched between the imaging mode and the reproduction mode.

When the function button 23 is pressed, a menu is displayed on the LCD panel 27. In this case, the user uses the right and left buttons of the four-direction key 24 to change the menu, uses the up and down buttons of the four-direction key 24 to select one item from the menu, and presses the OK button 25 to set the selected item. For example, ISO sensitivity, the on/off of a flash, and various items in the imaging mode or the reproduction mode are set by the above-mentioned operation.

The DISP/BACK key 26 is used to sequentially switch the display modes (for example, the display of only one image/the parallel display of a plurality of thumbnail images) of the images displayed on the LCD panel 27 in the reproduction mode or return the displayed image to the previous image.

Next, the structure of the lens barrel 100 shown in FIG. 1 will be described with reference to FIGS. 3 and 4.

Figure 3:
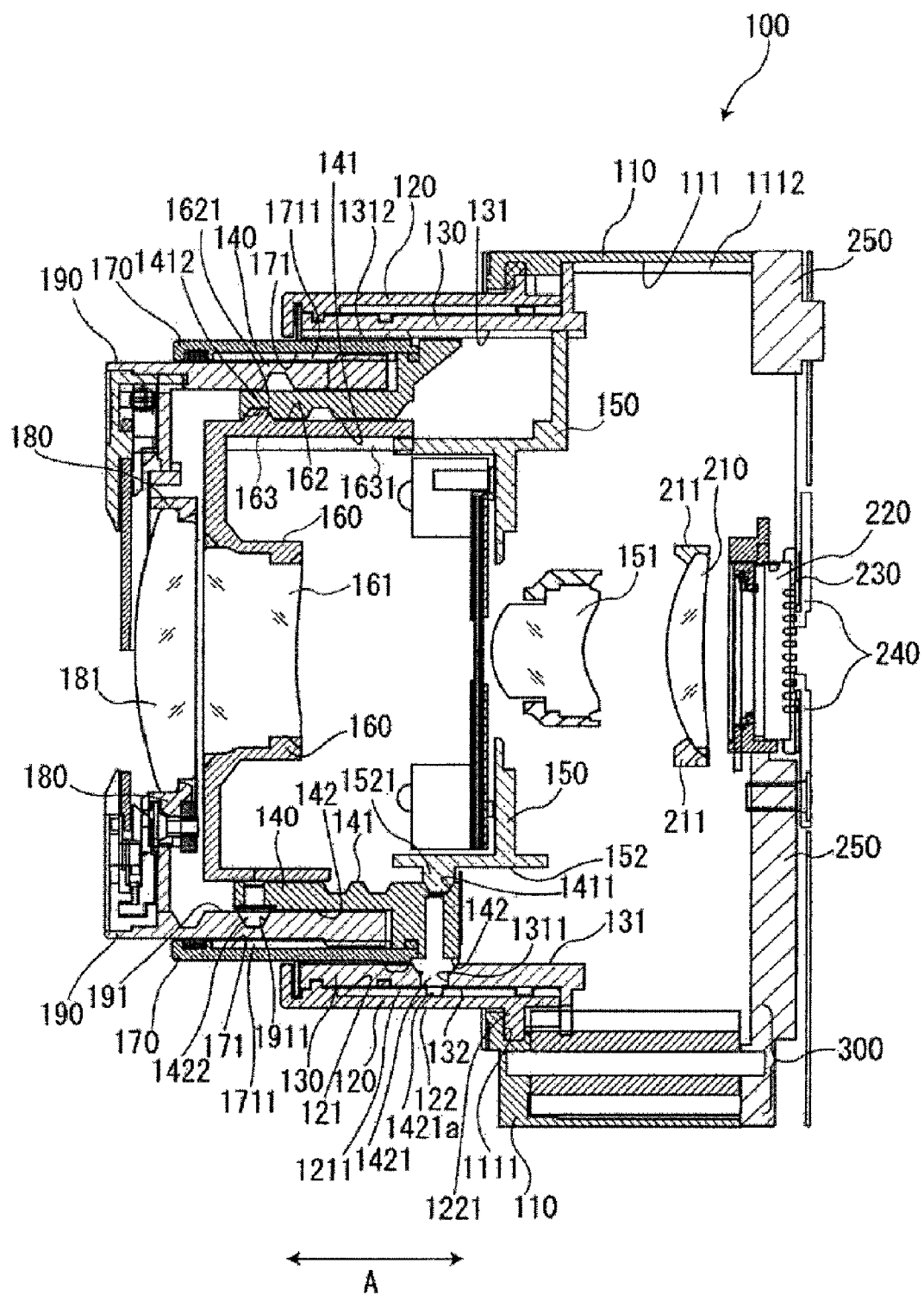
FIG. 3 is a cross-sectional view illustrating the internal structure of the lens barrel shown in FIG. 1 taken along the optical axis.

FIG. 3 is a cross-sectional view illustrating the internal structure of the lens barrel 100 shown in FIG. 1 taken along the optical axis direction. FIG. 4 is an exploded perspective view illustrating the lens barrel 100 shown in FIGS. 1 and 3.

Figure 4:
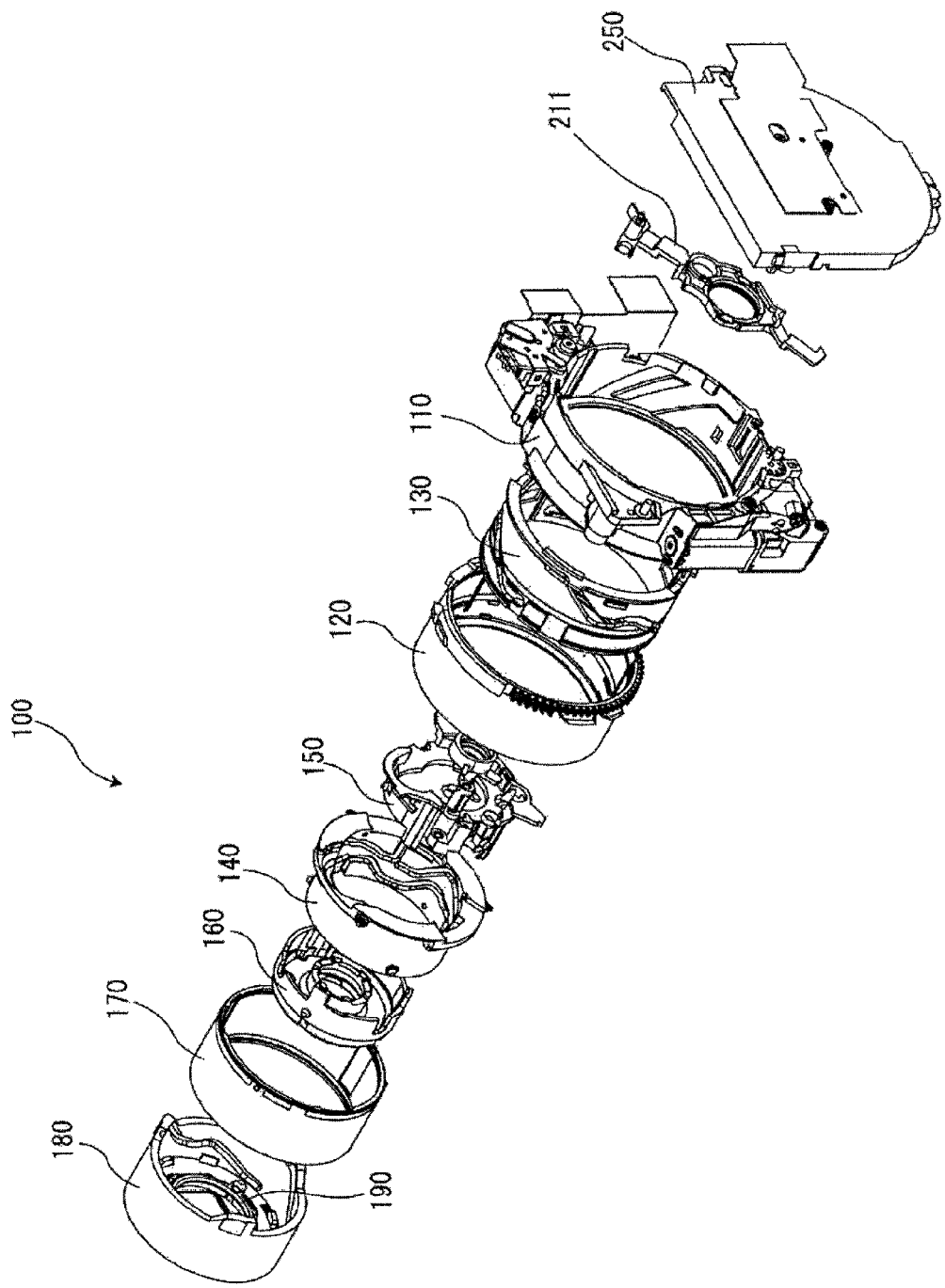
FIG. 4 is an exploded perspective view illustrating the lens barrel shown in FIGS. 1 and 3.

The lens barrel 100 shown in FIGS. 3 and 4 holds the zoom lens that includes three lens groups 151, 161, and 181, which are components of the imaging lens 200 (see FIG. 1) and can be extended or collapsed. The term 'lens groups' does not mean lens groups that are optically divided, but means lens groups as moving units. The lens barrel 100 includes a fixed cylinder 110, a second moving cylinder 120, a key ring 130, a cam cylinder 140, a third lens group frame 150 having a diameter smaller than that of a first moving cylinder 190, a second lens group frame 160 having a diameter smaller than that of the first moving cylinder 190, a third moving cylinder 170, the first moving cylinder 190 having a diameter greater than those of the third lens group frame 150 and the second lens group frame 160, a first lens group frame 180, and a driving gear 300.

When the T/W switching lever 21 shown in FIG. 2 is operated, a zooming motor (not shown) is rotated forward or backward according to whether the T/W switching lever is operated to a telephoto end or a wide-angle end. The driving force of the zooming motor is transmitted to the second moving cylinder 120 through the driving gear 300.

A cam groove 1111 and a straight-ahead key groove 1112 are provided in the inner surface 111 of the fixed cylinder 110.

A straight-ahead key groove 1211 is provided in the inner surface 121 of the second moving cylinder 120. In addition, a cam follower pin 1221 is provided on the outer surface 122 of the second moving cylinder 120 so as to protrude toward the outside. The cam follower pin 1221 is fitted to the cam groove 1111 that is provided in the inner surface 111 of the fixed cylinder 110. When the cam follower pin 1221 receives the driving force through the driving gear 300 that is engaged with both the second moving cylinder 120 and the zooming motor (not shown) and is moved along the cam groove 1111, the second moving cylinder 120 is moved in the direction of an arrow A, which is the optical axis direction, while being rotated about the optical axis with respect to the fixed cylinder 110.

A cam groove 1311 is provided in the key ring 130 so as to pass through it from the inner surface 131 to the outer surface 132. In addition, a straight-ahead key groove 1312 is provided in the inner surface 131 of the key ring 130. The key ring 130 is fitted to the straight-ahead key groove 1112 that is provided in the inner surface 111 of the fixed cylinder 110 and is moved in a straight line in the direction of the arrow A, which is the optical axis direction, without being rotated when the second moving cylinder 120 is rotated.

Two cam grooves 1411 and 1412 are provided in the inner surface 141 of the cam cylinder 140. In addition, a first cam follower pin 1421 is provided on the outer surface 142 of the cam cylinder 140 so as to protrude toward the outside when it is pressed. The cam cylinder 140 is provided between the inner surface 191 of the first moving cylinder 190 and the outer surfaces 162 and 152 of the second lens group frame 160 and the third lens group frame 150. The first cam follower pin 1421 is fitted to the cam groove 1311 passing through the key ring 130 from the inner surface 131 to the outer surface 132 and protrudes from the cam groove 1311 to the outside. A leading end portion 1421a of the first cam follower pin 1421 that protrudes toward the outside is fitted to the straight-ahead key groove 1211 that is provided in the inner surface 121 of the second moving cylinder 120. In addition, a second cam follower pin 1422 that is provided on the outer surface 142 of the cam cylinder 140 at a position closer to the object side (the left side in the direction of the arrow A) than the first cam follower pin 1421 in the optical axis direction so as to protrude toward the outside. The cam cylinder 140 is moved along the cam groove 1311 of the key ring 130 in the direction of the arrow A, which is the optical axis direction, while being rotated integrally with the second moving cylinder 120 about the optical axis with respect to the fixed cylinder 110, when the second moving cylinder 120 is rotated.

The third lens group frame 150 holds the third lens group 151 of the zoom lens with a mechanism (not shown) interposed therebetween. A cam follower pin 1521 is provided on the outer surface 152 of the third lens group frame 150 so as to protrude toward the outside. The cam follower pin 1521 is fitted to the cam groove 1411 of the two cam grooves 1411 and 1412 that are provided in the inner surface 141 of the cam cylinder 140. The third lens group frame 150 is fitted to the straight-ahead key groove 1312 that is provided in the inner surface 131 of the key ring 130 and is moved in a straight line in the direction of the arrow A, which is the optical axis direction, without being rotated when the cam cylinder 140 is rotated.

The second lens group frame 160 holds the second lens group 161 of the zoom lens. A cam follower pin 1621 is provided on the outer surface 162 of the second lens group frame 160 so as to protrude toward the outside. The cam follower pin 1621 is fitted to the cam groove 1412 of the two cam grooves 1411 and 1412 that are provided in the inner surface 141 of the cam cylinder 140. In addition, a straight-ahead key groove 1631 is provided in the inner surface 163 of the second lens group frame 160. The third lens group frame 150 is fitted to the straight-ahead key groove 1631 that is provided in the inner surface 163 of the second lens group frame 160. Therefore, the second lens group frame 160 is moved in a straight line in the direction of the arrow A, which is the optical axis direction, without being rotated when the cam cylinder 140 is rotated.

A straight-ahead key groove 1711 is provided in the inner surface 171 of the third moving cylinder 170. The third moving cylinder 170 is fitted to the straight-ahead key groove 1312 that is provided in the inner surface 131 of the key ring 130 and is moved in a straight line in the direction of the arrow A, which is the optical axis direction, without being rotated when the cam cylinder 140 is rotated.

The first lens group frame 180 holds the first lens group 181 that is arranged closest to the object side among the three lens groups of the zoom lens.

The first lens group frame 180 is fixed to the inner surface 191 of the first moving cylinder 190. A cam groove 1911 is provided in the inner surface 191 of the first moving cylinder 190. The second cam follower pin 1422 that is provided on the outer surface 142 of the cam cylinder 140 so as to protrude toward the outside is fitted to the cam groove 1911. The first moving cylinder 190 is fitted to the straight-ahead key groove 1711 that is provided in the inner surface 171 of the third moving cylinder 170 and is moved in a straight line in the direction of the arrow A, which is the optical axis direction, without being rotated when the cam cylinder 140 is rotated.

FIGS. 3 and 4 also show a focus lens 210, which is a component of the imaging lens 200 (see FIG. 1), and a CCD image sensor 220 that is provided on the rear surface of the focus lens 210.

The focus lens 210 is held by a focus lens holding frame 211. The focus lens 210 is moved in the optical axis direction by a focus lens driving device (not shown) and is brought into focus on the center of the angle of view. In this way, the focus lens 210 continuously performs focusing using the focusing function. When the shutter button 12 (see FIGS. 1 and 2) is pressed halfway, a focus lock for locking the position of the focus lens 210 at that time is set. When the shutter button 12 (see FIGS. 1 and 2) is pressed fully, the shutter is opened to actually capture an image.

The CCD image sensor 220 is adhered and fixed to a CCD plate 240, with a flexible board 230 which is soldered to the rear side of the CCD image sensor 220 interposed therebetween. The CCD plate 240 having the CCD image sensor 220 adhered and fixed thereto is fixed to a base 250 by screws. The fixed cylinder 110 is also fixed to the base 250. Object light passing through the three lens groups 151, 161, and 181 and the focus lens 210 is incident on the CCD image sensor 220 and is converted into an analog image signal, which is an electric signal. An electronic circuit (not shown) performs image processing on the analog image signal and image data is recorded on a recording medium.

In the lens barrel 100 according to this embodiment, the first moving cylinder 190 in which the cam groove 1911 to which the second cam follower pin 1422 is fitted is provided in the inner surface 191 is arranged outside the cam cylinder 140 having the second cam follower pin 1422 provided on the outer surface 142. In addition, in the lens barrel 100, the third lens group frame 150 in which the cam follower pin 1521 fitted to the cam groove 1411 of the cam grooves 1411 and 1412 is provided on the outer surface 152 and the second lens group frame 160 in which the cam follower pin 1621 fitted to the cam groove 1412 of the cam grooves 1411 and 1412 is provided on the outer surface 162 are arranged inside the cam cylinder 140 having the cam grooves 1411 and 1412 provided in the inner surface 141. Therefore, unlike the lens barrel according to the related art in which the cam grooves are provided in the outer surface and the inner surface of the rotating cylinder (cam cylinder), the cam grooves do not overlap each other in a perspective view of the cam cylinder as viewed from a direction perpendicular to the optical axis. Therefore, according to the lens barrel 100 and the digital camera 1 including the lens barrel 100 according to this embodiment, it is possible to provide a lens barrel capable of preventing a reduction in strength while maintaining a small size and a small thickness.

In the above-described embodiment, the digital camera is given as an example of the imaging apparatus according to the invention, but the imaging apparatus according to the invention is not limited thereto. For example, the invention may be applied to a silver salt camera or an instant camera.

In the above-described embodiment, the CCD image sensor is given as an example of the imaging device according to the invention, but the imaging device according to the invention is not limited thereto. For example, a CMOS image sensor may be used as the imaging device.

In the above-described embodiment, the imaging lens includes the focus lens and the zoom lens including three lens groups, but the invention is not limited thereto. The imaging lens may include other lens groups.

What is claimed is:

1. A lens barrel comprising:
   at least three lens groups;
   a fixed cylinder;
   a first moving cylinder to which a first lens group frame that holds a first lens group arranged closest to an object side among the three lens groups is fixed and which has a cam groove formed in an inner surface thereof and is movable in a straight line in an optical axis direction;
   second and third lens group frames that respectively hold second and third lens groups among the three lens groups, are movable in a straight line in the optical axis direction, have diameters smaller than that of the first moving cylinder, and include cam pins formed on the outer surfaces thereof;
   a cam cylinder that is movable in the optical axis direction while being rotated about the optical axis with respect to the fixed cylinder, is provided between the inner surface of the first moving cylinder and the outer surfaces of the second and third lens group frames, and includes a cam pin which is provided on the outer surface and is fitted to the cam groove provided in the inner surface of the first moving cylinder and a cam groove which is provided in the inner surface and to which the cam pins provided on the outer surfaces of both the second lens group frame and the third lens group frame are fitted;
   a second moving cylinder;
   a key ring;
   wherein the fixed cylinder has a cam groove and a straight-ahead key groove provided in an inner surface thereof,
   the second moving cylinder includes a straight-ahead key groove that is provided in an inner surface thereof and a cam pin that is provided on an outer surface thereof and is fitted to the cam groove provided in the inner surface of the fixed cylinder,
   the second moving cylinder is moved in the optical axis direction while being rotated when the cam pin is moved along the cam groove by a driving force,
   the key ring includes a cam groove that passes through the key ring from an inner surface to an outer surface and a straight-ahead key groove that is provided in the inner surface thereof,
   the key ring is fitted to the straight-ahead key groove that is provided in the inner surface of the fixed cylinder and is moved integrally with the second moving cylinder in the optical axis direction, without being rotated, when the second moving cylinder is rotated,
   the cam cylinder further includes a cam pin that is provided on the outer surface so as to protrude toward the outside, is fitted to the cam groove passing through the key ring from the inner surface to the outer surface, protrudes from the cam groove to the outside, and has a leading end portion which protrudes toward the outside and is fitted to the straight-ahead key groove provided in the inner surface of the second moving cylinder, and
   the cam cylinder is moved along the cam groove of the key ring in the optical axis direction while being rotated integrally with the second moving cylinder when the second moving cylinder is rotated;
   and
   a third moving cylinder that is fitted to the straight-ahead key groove provided in the inner surface of the key ring and is moved integrally with the cam cylinder in the optical axis direction, without being rotated, when the cam cylinder is rotated,
   wherein the third lens group frame is fitted to the straight-ahead key groove provided in the inner surface of the key ring and is moved in the optical axis direction, without being rotated, when the cam cylinder is rotated,
   the second lens group frame has a straight-ahead key groove provided in the inner surface thereof,
   the third lens group frame is fitted to the straight-ahead key groove of the second lens group frame,
   the second lens group frame is moved in the optical axis direction, without being rotated, when the cam cylinder is rotated, and
   the first moving cylinder is fitted to the straight-ahead key groove provided in the inner surface of the third moving cylinder and is moved in the optical axis direction, without being rotated, when the cam cylinder is rotated.

2. An imaging apparatus comprising:
   the lens barrel according to claim 1;
   a camera body which includes an imaging device and to which the fixed cylinder is fixed; and
   an imaging lens including at least three lens groups and a focus lens that form the image of an object on the imaging device.

* * * * *